US010068375B2

(12) United States Patent
Tanaka

(10) Patent No.: US 10,068,375 B2
(45) Date of Patent: Sep. 4, 2018

(54) INFORMATION PROCESSING APPARATUS, INFORMATION PROCESSING METHOD, AND RECORDING MEDIUM

(71) Applicant: CANON KABUSHIKI KAISHA, Tokyo (JP)

(72) Inventor: Yasumi Tanaka, Funabashi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 30 days.

(21) Appl. No.: 14/852,186

(22) Filed: Sep. 11, 2015

(65) Prior Publication Data
US 2016/0078684 A1 Mar. 17, 2016

(30) Foreign Application Priority Data

Sep. 12, 2014 (JP) ................................. 2014-186532

(51) Int. Cl.
| G09G 5/12 | (2006.01) |
| G06T 19/00 | (2011.01) |
| G06T 7/73 | (2017.01) |

(52) U.S. Cl.
CPC ............. *G06T 19/006* (2013.01); *G06T 7/73* (2017.01); *G06T 2200/24* (2013.01); *G06T 2207/30204* (2013.01); *G06T 2207/30244* (2013.01)

(58) Field of Classification Search
CPC .................................................... G06T 19/006
USPC ......................................................... 345/633
See application file for complete search history.

(56) References Cited

U.S. PATENT DOCUMENTS

| 8,073,243 | B2* | 12/2011 | Mareachen | G06T 11/00 |
| | | | | 382/103 |
| 8,352,415 | B2* | 1/2013 | Gaponenko | G06F 8/63 |
| | | | | 365/185.16 |
| 8,355,531 | B2* | 1/2013 | Aratani | G06T 7/246 |
| | | | | 345/633 |
| 9,153,073 | B2* | 10/2015 | Langlotz | G06T 19/006 |
| 2002/0094189 | A1* | 7/2002 | Navab | H04N 19/27 |
| | | | | 348/207.99 |
| 2003/0080978 | A1* | 5/2003 | Navab | G01S 5/16 |
| | | | | 345/633 |

(Continued)

FOREIGN PATENT DOCUMENTS

JP 2008-134161 A 6/2008

OTHER PUBLICATIONS

A Markerless Registration Method for Augmented Reality based on Affine Properties, Y. Pang*, M.L. Yuan∞, A.Y.C. Nee∞, S.K. Ong∞, Kamal Youcef-Toumi,2006, Australian Computer Society, Inc.*

*Primary Examiner* — Javid A Amini
(74) *Attorney, Agent, or Firm* — Canon U.S.A., Inc. IP Division

(57) ABSTRACT

To notify a user of an area where marker-based position and orientation measurement becomes unstable, an information processing apparatus according to the present specification includes, a first acquisition unit configured to acquire arrangement information and size information of a marker arranged in a real space, a second acquisition unit configured to acquire information about an imaging apparatus for capturing the real space, an unstable area derivation unit configured to derive an unstable area where the imaging apparatus is unable to stably detect the marker arranged in the real space, based on the arrangement information and the size information of the marker and the information about the imaging apparatus, and an output unit configured to output the area derived by the derivation unit.

20 Claims, 13 Drawing Sheets

(56) References Cited

U.S. PATENT DOCUMENTS

| | | | |
|---|---|---|---|
| 2003/0227542 A1* | 12/2003 | Zhang | G02B 27/017 348/61 |
| 2004/0104935 A1* | 6/2004 | Williamson | G06F 3/012 715/757 |
| 2006/0050087 A1* | 3/2006 | Tanimura | G06F 3/011 345/629 |
| 2006/0071946 A1* | 4/2006 | Anabuki | G06F 3/0325 345/633 |
| 2008/0122869 A1* | 5/2008 | Aratani | G06T 7/246 345/633 |
| 2008/0266323 A1* | 10/2008 | Biocca | G06F 3/014 345/633 |
| 2010/0017407 A1* | 1/2010 | Beniyama | G06F 17/30259 707/E17.016 |
| 2010/0048290 A1* | 2/2010 | Baseley | A63F 13/10 463/25 |
| 2010/0214284 A1* | 8/2010 | Rieffel | G06T 17/00 345/419 |
| 2011/0216090 A1* | 9/2011 | Woo | G06K 9/00 345/633 |
| 2011/0279697 A1* | 11/2011 | Shingu | H04N 5/2621 348/222.1 |
| 2012/0086727 A1* | 4/2012 | Korah | G06T 19/006 345/633 |
| 2013/0148851 A1* | 6/2013 | Leung | G06K 9/3241 382/103 |
| 2013/0241955 A1* | 9/2013 | Tamaru | G02B 27/01 345/633 |
| 2013/0265392 A1* | 10/2013 | Rhee | G06F 3/005 348/46 |
| 2014/0156219 A1* | 6/2014 | Soubra | G01C 15/00 702/150 |
| 2014/0225916 A1* | 8/2014 | Theimer | G06T 19/006 345/633 |

* cited by examiner

INFORMATION PROCESSING APPARATUS, INFORMATION PROCESSING METHOD, AND RECORDING MEDIUM

BACKGROUND OF THE INVENTION

Field of the Invention

The present invention relates to an information processing apparatus and an information processing method, and more particularly, to an information processing apparatus for presenting mixed reality.

Description of the Related Art

Recent years have seen active researches on mixed reality (MR) aiming at seamless coupling of the real and virtual spaces. An image display apparatus for presenting mixed reality has, for example, the following configuration. The image display apparatus superimposes a virtual space image (e.g., virtual objects and text information drawn by computer graphics) generated according to the position and orientation of an imaging apparatus such as a video camera onto a real space image captured by the imaging apparatus. A head-mounted display (HMD), for example, can be used as such an image display apparatus as discussed in Japanese Patent Application Laid-Open No. 2008-134161.

The image display apparatus is also implemented by the optical see-through method for displaying a virtual space image generated according to the position and orientation of the user's viewpoint on an optical see-through display mounted on the user's head.

Meanwhile, Japanese Patent Application Laid-Open No. 2008-134161) discusses a technique for using markers to calculate the position and orientation of an imaging apparatus based on a real image acquired from the imaging apparatus.

However, in the marker-based position and orientation measurement, since the sizes and the number of visible markers differ according to the user's position, there has been an area where marker-based position alignment becomes unstable depending on the user's position. Accordingly, there has been a problem that the user experiencing MR does not know which area is an area where the marker-based position and orientation measurement becomes unstable.

SUMMARY OF THE INVENTION

To achieve the above-described objective, an information processing apparatus according to the present specification includes, for example, a first acquisition unit configured to acquire arrangement information and size information of a marker arranged in a real space, a second acquisition unit configured to acquire information about an imaging apparatus for capturing the real space, an unstable area derivation unit configured to derive an unstable area where the imaging apparatus is unable to stably detect the marker arranged in the real space, based on the arrangement information and the size information of the marker and the information about the imaging apparatus, and an output unit configured to output the area derived by the derivation unit.

According to the present invention, it becomes possible to notify a user of an area where marker-based position and orientation measurement becomes unstable.

Further features of the present invention will become apparent from the following description of exemplary embodiments with reference to the attached drawings.

DESCRIPTION OF THE EMBODIMENTS

Prior to descriptions of exemplary embodiments according to the present invention, a hardware configuration of an information processing apparatus according to each exemplary embodiment will be described below with reference to FIG. 12.

Figure 12:
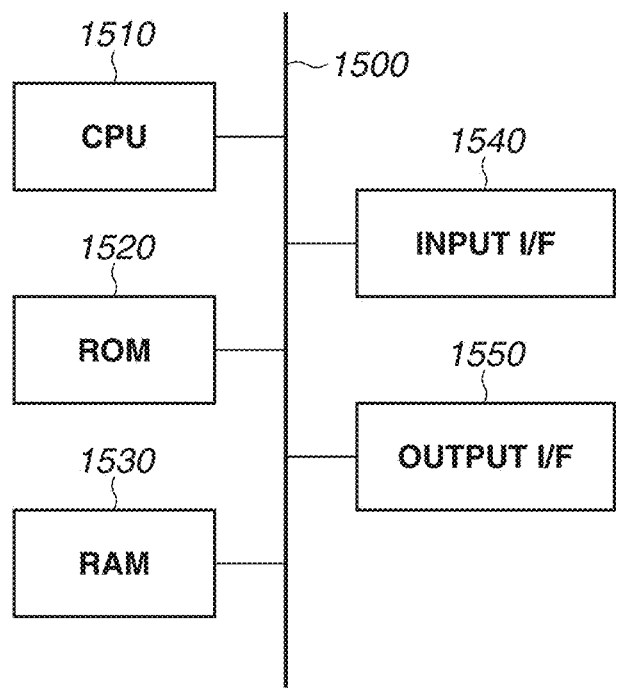
FIG. 12 is a block diagram illustrating a hardware configuration example of the information processing apparatus according to an exemplary embodiment of the present invention.

FIG. 12 illustrates the hardware configuration of the information apparatus according to an exemplary embodiment. Referring to FIG. 12, a central processing unit (CPU) 1510 controls each device connected via a bus 1500. The CPU 1510 reads a processing step and a program stored in a read only memory (ROM) 1520 and then executes them. An operating system (OS), and processing programs and device drivers according to the present exemplary embodiment are stored in the ROM 1520, temporarily stored in a random access memory (RAM) 1530, and executed by the CPU 1510 as appropriate. An input I/F 1540 inputs an input signal in a format processable by the information processing apparatus from an external apparatus (a display apparatus and an operation apparatus). An output I/F 1550 outputs an output signal in a format processable by the display apparatus to the external apparatus (the display apparatus).

Figure 1:
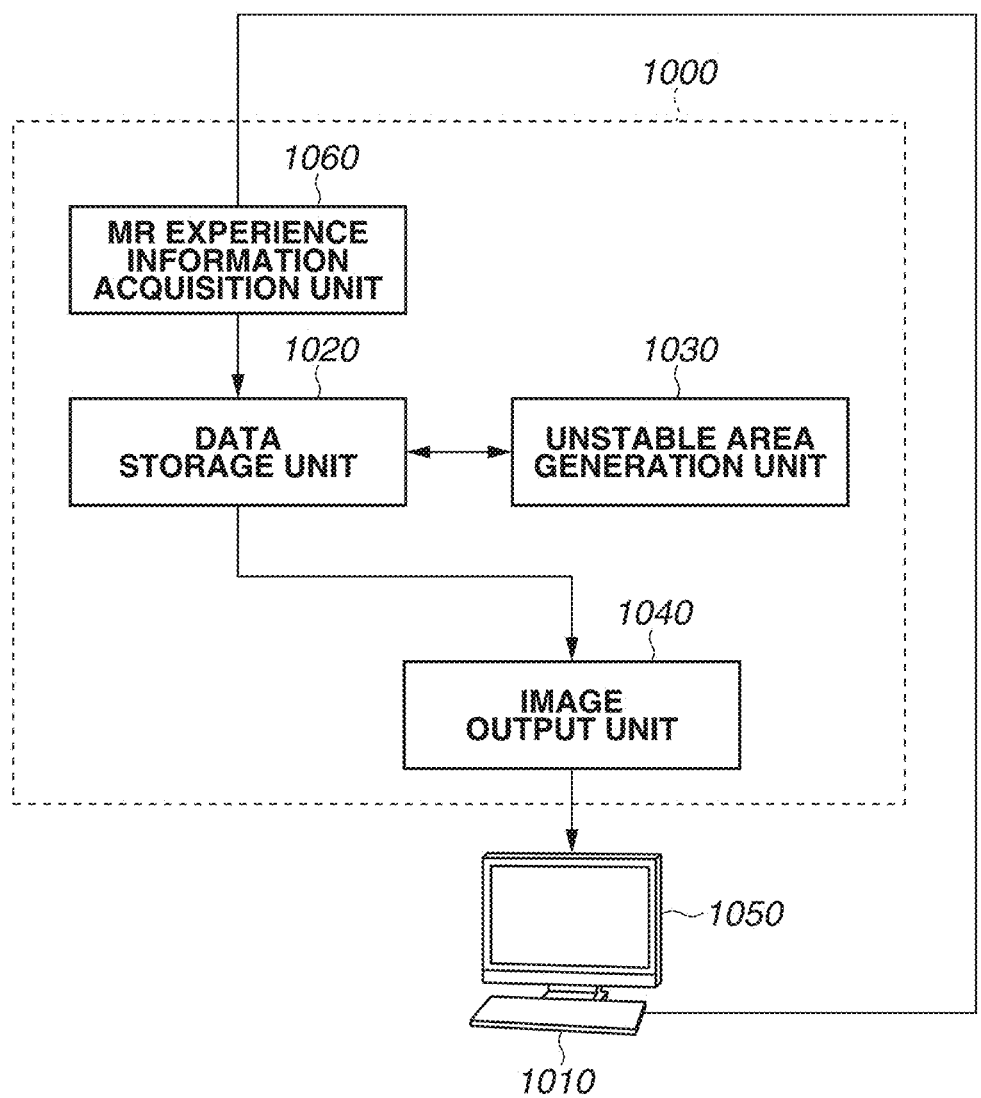
FIG. 1 is a block diagram illustrating a functional configuration example of an information processing apparatus according to an exemplary embodiment of the present invention.

A functional configuration example of the information processing apparatus according to a first exemplary embodiment will be described below with reference to the block diagram illustrated in FIG. 1. As illustrated in FIG. 1, the information processing apparatus according to the present exemplary embodiment includes a main unit 1000, a display unit 1050, and an operation unit 1010.

First, the display unit 1050 will be described below. The display unit 1050 includes a cathode-ray tube (CRT) or a liquid crystal display (LCD) and displays images and texts based on data output from the main unit 1000.

Next, the operation unit 1010 will be described below. The operation unit 1010 includes a keyboard and a mouse and, when operated by a user, inputs various instructions to the main unit 1000.

The main unit 1000 will be described below. As illustrated in FIG. 1, the main unit 1000 includes a data storage unit 1020, an unstable area generation unit 1030, and an image output unit 1040.

Figure 13:
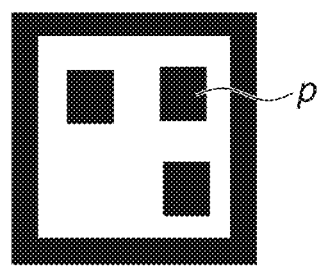
FIG. 13 illustrates an example of a marker.

The data storage unit 1020 stores MR experience environmental information acquired via an MR experience information acquisition unit 1060 by the user operating the operation unit 1010. The MR experience environmental information refers to information used to acquire an unstable area where position and orientation measurement cannot be stably performed based on a marker arranged in the real space. This information will be described in detail below. An example of a marker used in the present exemplary embodiment is illustrated in FIG. 13. The marker illustrated in FIG. 13 has a rectangular shape. There are three black rectangles p in an area inside a black thick frame. Each marker has different number of black rectangles p (identification information) at different positions. Each marker can be uniquely determined by detecting (identifying) the pattern of the black rectangles p based on an image captured by an imaging apparatus.

The unstable area generation unit 1030 calculates an area where position alignment becomes unstable when position alignment is performed based on features on an image by using an imaging device based on the MR experience environmental information stored in the data storage unit 1020. Then, the unstable area generation unit 1030 stores information about the calculated unstable area in the data storage unit 1020. This processing will be described in detail below with reference to the flowchart illustrated in FIG. 11.

The MR experience information acquisition unit 1060 acquires the MR experience environmental information by the user operating the operation unit 1010. Then, the MR experience information acquisition unit 1060 stores the acquired MR experience environmental information in the data storage unit 1020.

Figure 4:
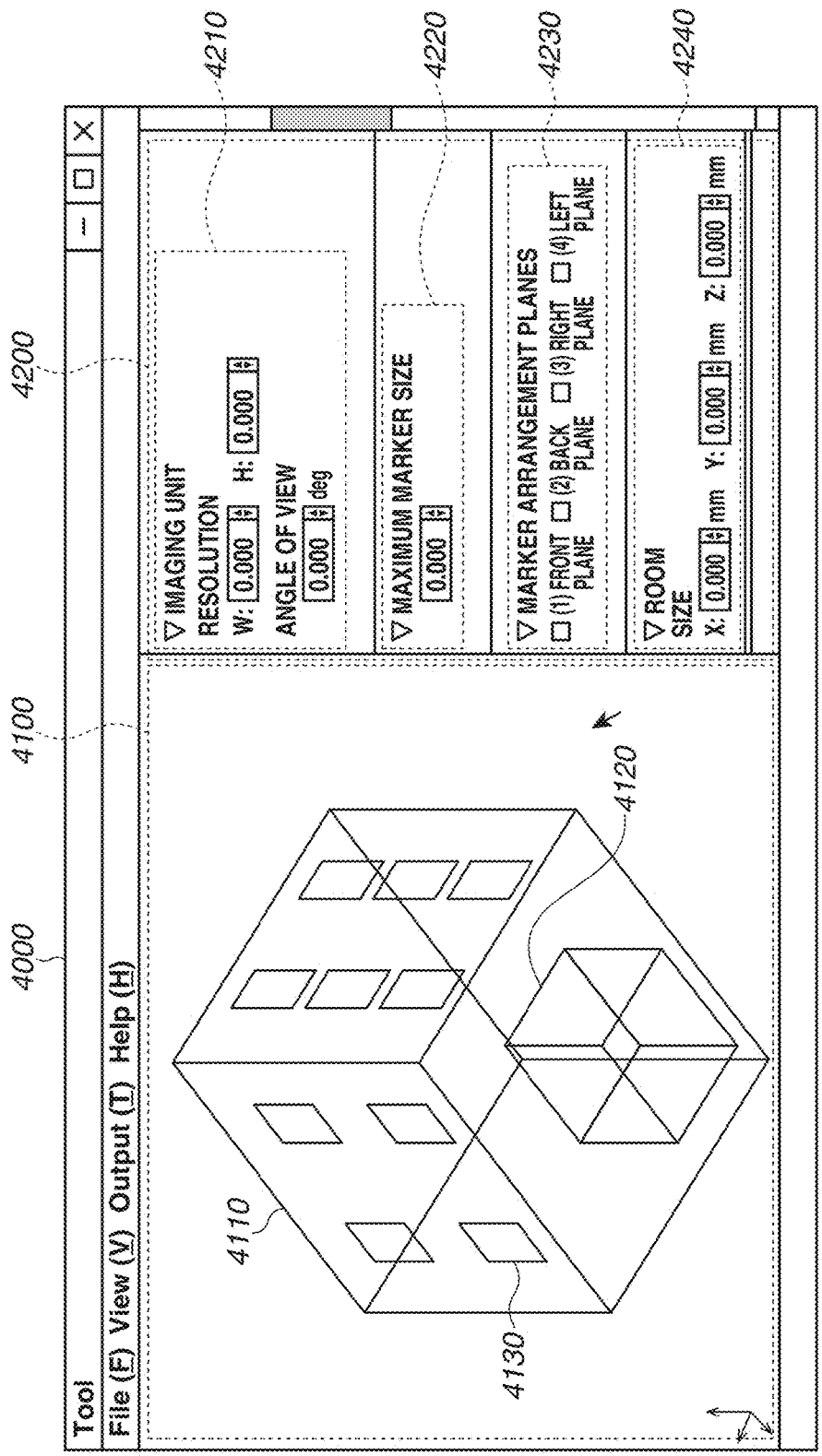
FIG. 4 illustrates a graphical user interface (GUI) according to an exemplary embodiment of the present invention.

The image output unit 1040 outputs the unstable area information stored in the data storage unit 1020 to the display unit 1050. In this case, the output image may include not only an unstable area but also an interface for inputting the MR experience environmental information as illustrated in FIG. 4, and may include an image that enables the user to three-dimensionally confirm information about an MR experience environment.

Each of these functional units is implemented by the CPU 1510 loading a program stored in the ROM 1520 onto the RAM 1530 and then executing processing according to each flowchart (described below). For example, to configure hardware in substitution for software processing using the CPU 1510, it is necessary to configure calculation units and circuits corresponding to processing of these functional units (described below).

Figure 2:
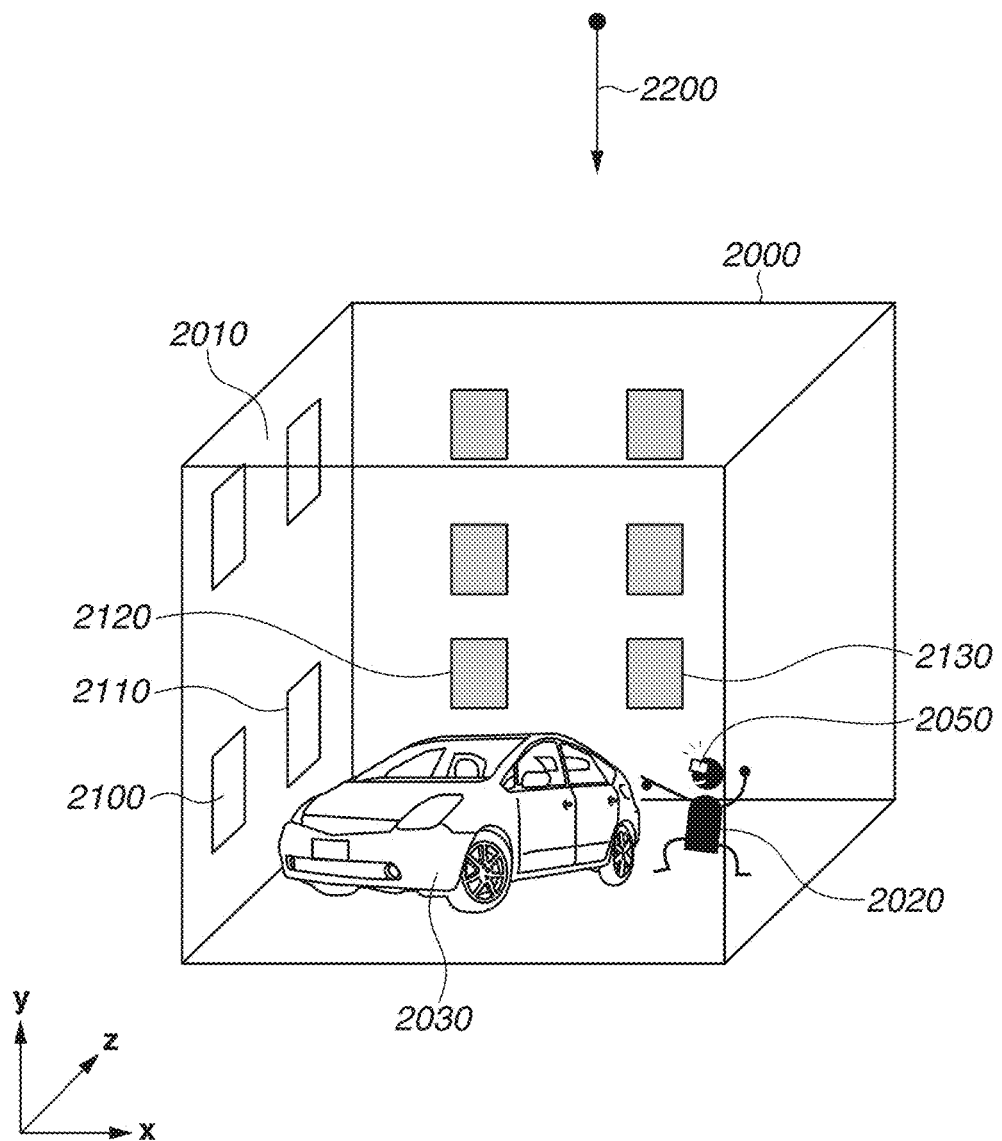
FIG. 2 is an overhead view illustrating an environment where a user is experiencing mixed reality (MR).

FIG. 2 illustrates an environment where a user 2020 is experiencing mixed reality. Referring to FIG. 2, a cube 2000 indicates a real space in a range observable by the user 2020 experiencing mixed reality, and a plurality of markers is arranged on a wall 2010 in the real space.

Figure 3:
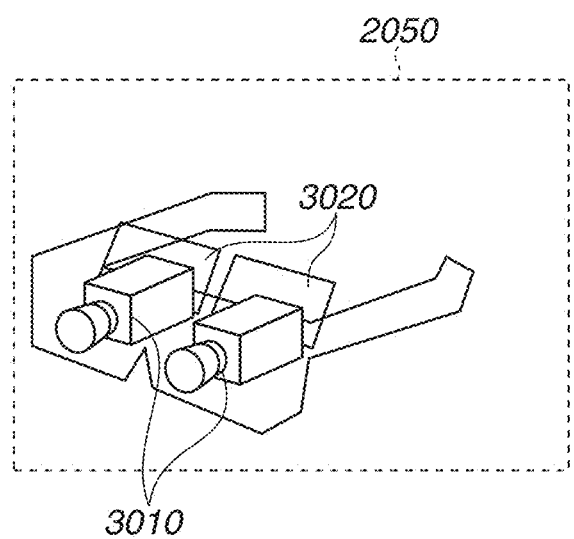
FIG. 3 illustrates a head-mounted display apparatus.

To experience mixed reality, the user 2020 wears a head-mounted display apparatus on his or her head. As is publicly known, this head-mounted display apparatus is provided with a display unit and a camera for capturing the real space. A camera 2050 is illustrated in FIG. 2. FIG. 3 illustrates an example of the head-mounted display apparatus.

The cube 2000 represents a space where the user 2020 wearing the head-mounted display apparatus experiences mixed reality. Referring to FIG. 2, the camera 2050 captures markers on the wall 2010 in an area inside the field of view of the camera 2050, and outputs the captured image to a mixed reality presentation apparatus (that may be an information processing apparatus according to the present exemplary embodiment or a different apparatus). The mixed reality presentation apparatus acquires the position and orientation of the camera 2050 by using the markers included in the captured image. A technique for acquiring the position and orientation of the camera 2050 by using a captured image of the markers is a publicly-known technique as discussed, for example, in the above-described Japanese Patent Application Laid-Open No. 2008-134161, and descriptions thereof will be omitted. Then, the mixed reality presentation apparatus generates an image of a virtual object 2030 according to the acquired position and orientation and then transmits to the display unit of the head-mounted display apparatus a combined image formed of the generated image of the virtual object 2030 and the image captured by the camera 2050. Since the combined image is displayed on the display unit, the user 2020 wearing the head-mounted display apparatus on his or her head is able to observe the combined image before his or her eyes. Thus, the user 2020 is able to experience mixed reality.

As described above, the camera 2050 is movable within a range represented by the cube 2000. How the markers arranged on the wall 2010 are seen by the user 2020 changes according to the position of the camera 2050. If a sufficient number of markers are not included in the field of view, the number of markers appearing on the captured image is not sufficient, resulting in a large influence on the accuracy of position and orientation calculations.

In the present exemplary embodiment, therefore, the information processing apparatus illustrated in FIG. 1 performs processing for acquiring and outputting an area where the accuracy of position and orientation calculations becomes unstable within the range represented by the cube 2000. The following describes processing performed by the information processing apparatus according to the present exemplary embodiment to determine a marker arrangement pattern that enables a sufficient number of markers to be captured in the captured image, with reference to the flowchart illustrated in FIG. 11.

Figure 11:
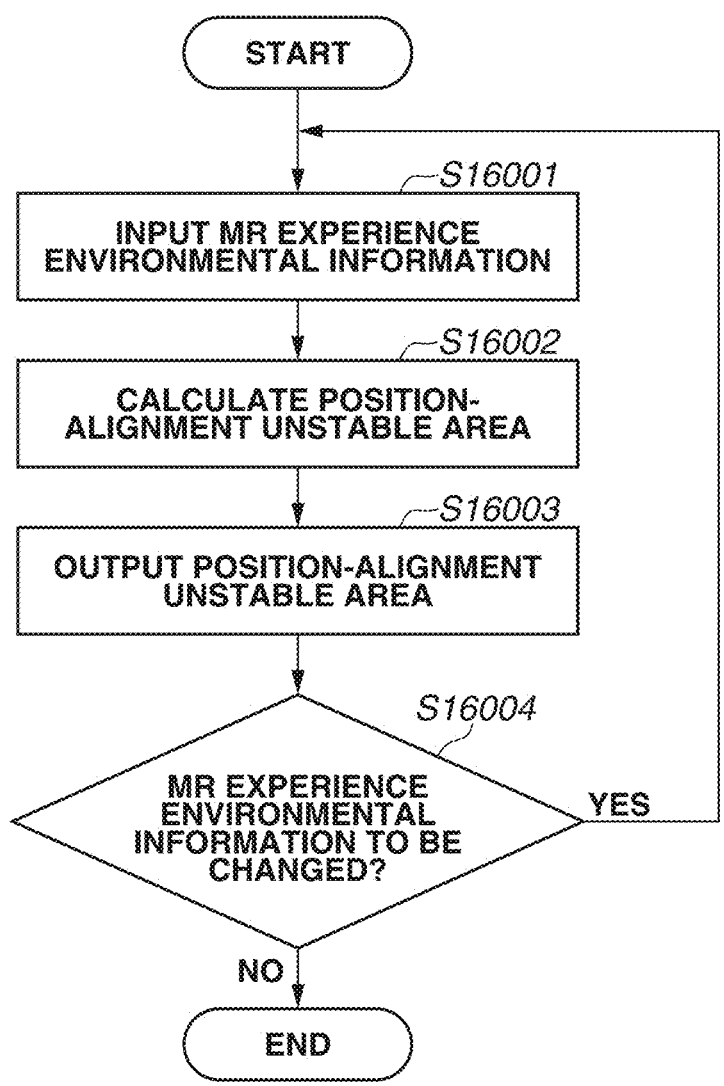
FIG. 11 is a flowchart illustrating processing of the information processing apparatus according to an exemplary embodiment of the present invention.

FIG. 11 is a flowchart illustrating processing for generating the above-described unstable area via the main unit 1000 based on the MR experience environmental information input via the operation unit 1010, and storing the above-described unstable area.

In step S16001, the user operates the operation unit 1010 to input the MR experience environmental information. The MR experience information acquisition unit 1060 acquires the MR experience environmental information and then stores the relevant information in the data storage unit 1020. As described above, the MR experience environmental information refers to information used to determine a plurality of types of arrangement pattern candidates with which at least a specified number of markers are observable from a position within a range where the user is able to experience mixed reality in the real space. Therefore, the MR experience environmental information may be any types of information as long as the information achieves a similar objective. For example, the MR experience environmental information includes the following information.

Information that defines a real space (a space represented by the cube 2000 in the case of the environment illustrated in FIG. 2) in a range observable by the user 2020 experiencing mixed reality (real space information)

Arrangement positions and sizes of markers arranged in the real space (arrangement information and size information)

Information representing the field of view of the camera included in the head-mounted display apparatus (angle-of-view information, camera resolution and lens distortion information, and focal length information)

The real space information refers to information that defines a movable range for the user 2020 experiencing mixed reality in a world coordinate system set in the real space. (The world coordinate system refers to a coordinate system in which one point in the real space is used as an origin, and three axes perpendicularly intersecting with each other at the origin are referred to as an x-axis, a y-axis, and a z-axis, respectively.) Referring to FIG. 2, the real space information may be information that defines a space in the world coordinate system represented by the cube 2000, or information that defines positions in the world coordinate system at which markers are to be arranged. Further, the user may display a virtual object simulating the real space on the display unit 1050, specify a portion on the virtual object by operating the operation unit 1010, define the portion in the world coordinate system, and use information related to the definition as the real space information.

In addition to the above-described information, the MR experience environmental information may include such information that defines an area where the virtual object is to be arranged.

These pieces of data may be acquired via a graphical user interface (GUI) as illustrated in FIG. 4. More specifically, a control unit (not illustrated) displays the GUI illustrated in FIG. 4 on the display unit 1050, and the user operates the operation unit 1010 to input each piece of data. Setting items illustrated in FIG. 4 will be described below.

The resolution and the angle of view of an imaging unit 3010 are input to an imaging unit data input portion 4210. These setting items may be input by the user via the operation unit 1010, or the relevant information may be automatically acquired from the imaging unit 3010 connected (second acquisition).

The maximum marker size is input to a maximum marker size input portion 4220. This information is used as an upper limit of the marker size when automatically generating marker arrangement information. As the marker arrangement information, the user may specify marker sizes, marker identifications, and marker positions (first acquisition).

Planes on which markers are to be arranged are input to a marker arrangement plane input portion 4230 (first acquisition).

Information about a space for MR experience is input to a real space information input portion 4240. In this case, not only a room but also an area for MR experience may be specified.

The user may specify the size and position of the virtual object 2030, and other information related to an MR experience environment of the cube 2000.

Then, the processing proceeds to step S16002.

In step S16002, the unstable area generation unit 1030 acquires the wall 2010 on which a marker 2100 is to be arranged, and a position-alignment unstable area 6000 where position alignment becomes unstable in the MR experience environment of the cube 2000 where the MR user 2020 experiences MR (unstable area derivation).

An example of a method for calculating the position-alignment unstable area 6000 will be described in detail below with reference to FIG. 5.

Figure 5:
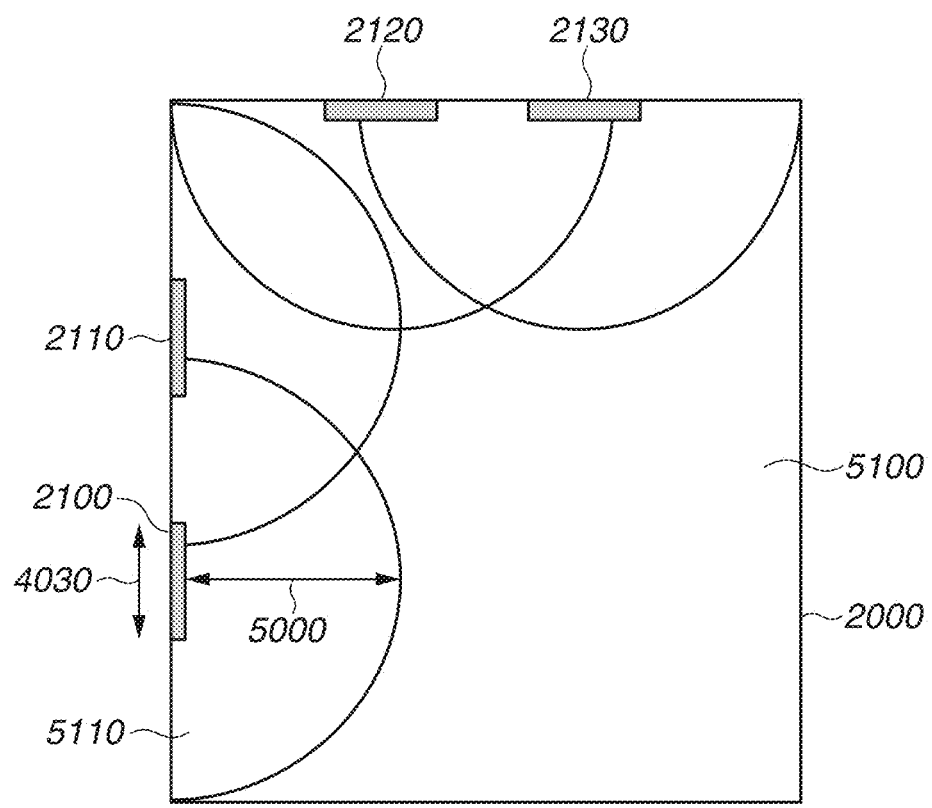
FIG. 5 illustrates an unstable area.

FIG. 5 illustrates the environment illustrated in FIG. 2 when viewed from an overhead viewpoint 2200, and an area 5100 where position alignment becomes unstable. Portions equivalent to those in FIG. 2 are assigned the same reference numerals, and descriptions thereof will be omitted.

Referring to FIG. 5, a distance 5000 where position alignment with respect to the marker 2100 does not become stable has a distance d, a marker 4030 has a marker size S, and the imaging unit 3010 has a resolution K. Formula (1) defines a relation among these values, where a constant M may be specified by the user or determined by a system. For example, a plurality of markers having different sizes is captured in advance at different distances by using the imaging unit 3010, and distances at which markers are recognizable are respectively acquired. When this procedure is performed with imaging apparatuses having different resolutions, a relation between the resolution K, the distance d, and the marker size S is acquired. The constant M can be statistically acquired based on the acquired relation.

Figure 6:
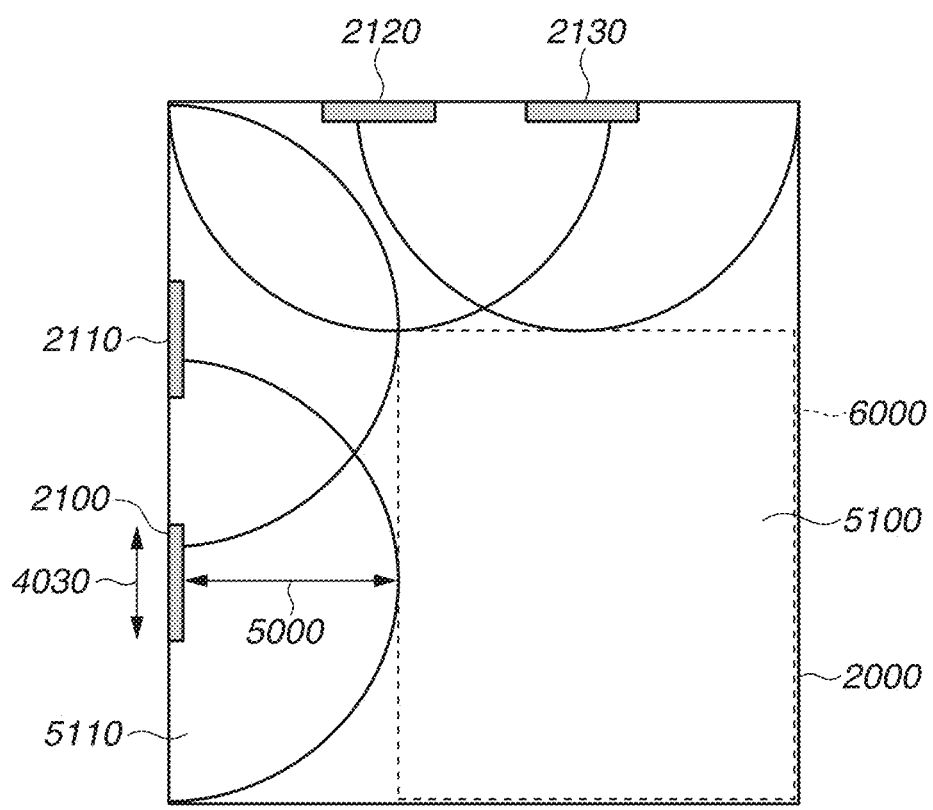
FIG. 6 illustrates an unstable area represented in a rectangular form.
Figure 7:
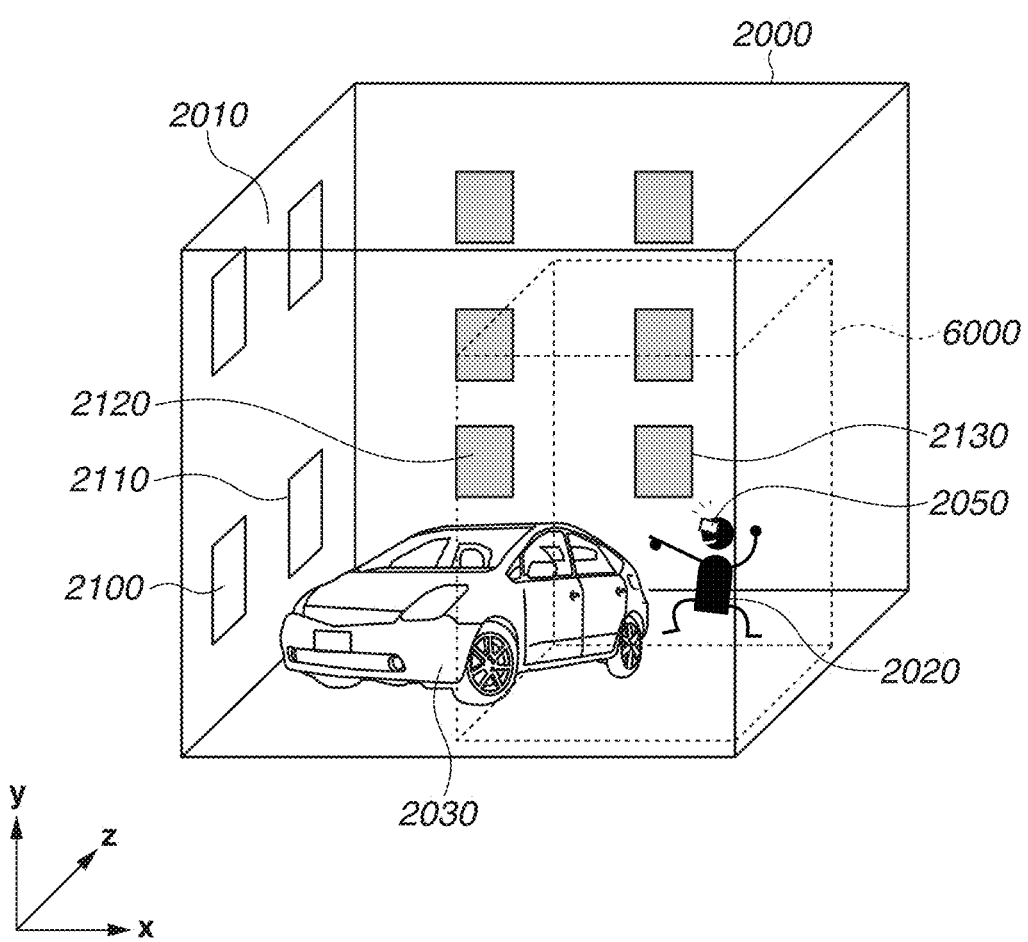
FIG. 7 illustrates an unstable area represented in a three-dimensional form.

A position-alignment stable area 5110 refers to an area within a range of the distance d from the marker 4030. An area outside the range of the distance d from the marker 4030 is recognized as an unstable area with respect to the marker 4030. Similarly, the unstable area generation unit 1030 calculates position-alignment unstable areas with respect to markers 2110, 2120, and 2130, and other markers, and calculates the area 5100 where these position-alignment unstable areas overlap with one another. In other words, the area 5100 is not a position-alignment stable area with respect to any markers. In this case, the unstable area generation unit 1030 may abstract the area 5100 so that it fits into a cube, such as the unstable area 6000 illustrated in FIG. 6. In this case, the unstable area 6000 in FIG. 7 is obtained by three-dimensionally representing the unstable area 6000.

[Formula 1]

$$d = M \times K \times S \quad (1)$$

Although, in the present exemplary embodiment, an area where position alignment becomes unstable is acquired as described above, an area where position alignment becomes unstable may be acquired by using other methods. For example, an area where a marker is hidden by a real object ("not visible" area) may be recognized as an unstable area. When using a marker as illustrated in FIG. 13, for example, an unstable area may be determined based on the size of the black rectangles p, which is identification information. In the present exemplary embodiment, even though the distance d is acquired by using the camera resolution, the distance d may be acquired by using the lens distortion information, the focal length information, and the angle-of-view information instead of the camera resolution. The distance d may be acquired by combining these information items.

The processing proceeds to step S16003.

In step S16003, the image output unit 1040 outputs the information about the unstable area 6000 calculated in step S16002 to the display unit 1050. The image output unit 1040 may output to the display unit 1050 an area other than the unstable area 6000 calculated in step S16002 as a stable area (stable area derivation)

The display unit 1050 displays the information about the unstable area 6000 received from the image output unit 1040. An example of a display method will be described in detail below with reference to FIG. 4.

Referring to FIG. 4, an MR experience environmental information display portion 4100 illustrated in FIG. 4 is an area for displaying an MR experience environment 4110 based on the information input from the MR experience environmental information input portion 4200. The MR experience environment 4110 is composed of information about a marker 4130, a position-alignment unstable area 4120, and the information input from the MR experience environmental information input portion 4200. The image output unit 1040 displays the position-alignment unstable area 6000 calculated in step S16002 on the position-alignment unstable area 4120 in the MR experience environmental information visualization portion 4100 of an application 4000 on the display screen illustrated in FIG. 4. In this case, methods for visualizing an unstable area include using a wire frame, a semi-transparent box, highlight display, and color change, or other methods can be applied as long as the unstable area can be distinguished. Then, the processing proceeds to step S16004.

In step S16004, the main unit 1000 determines whether the user changes the MR experience environmental information again. When the user changes the information (YES in step S16004), the processing returns to step S16001. On the other hand, when the user does not change the information (NO in step S16004), the processing exits this flowchart.

According to the present exemplary embodiment, it becomes possible to visualize a position-alignment unstable area where position alignment becomes unstable based on the MR experience environmental information input by the user.

Figure 10:
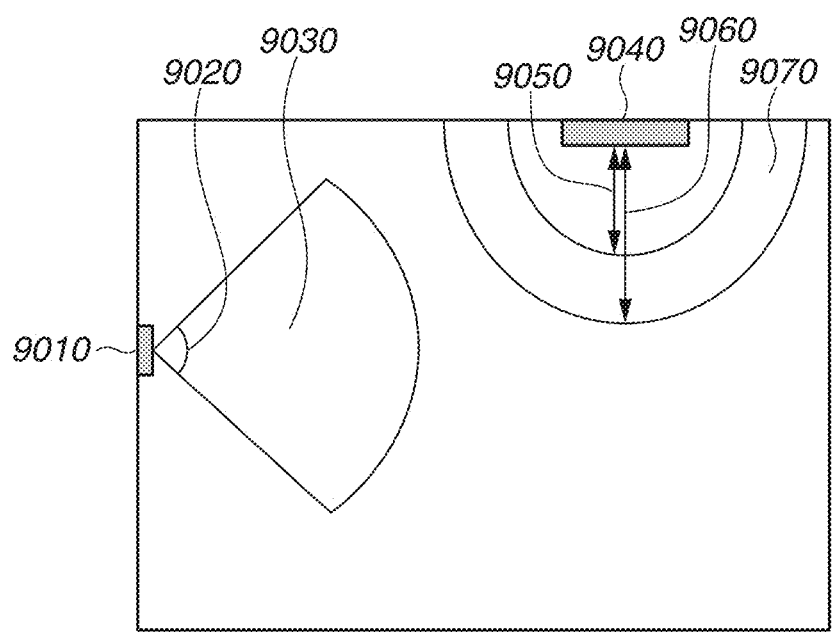
FIG. 10 illustrates an unstable area.

In the above-described exemplary embodiment, an area outside the range of the distance d from a marker is recognized as a position-alignment unstable area. At this time, as illustrated in FIG. 10, when acquiring a position-alignment unstable area with respect to a marker 9010, an angle 9020, an arbitrary angle specified by the user, may be taken into consideration. In this case, an area 9030 is recognized as a position-alignment stable area with respect to the marker 9010, and the other area is recognized as a position-alignment unstable area.

It is also possible to recognize an area 9070 outside a range of a distance 9050 and within a range of a distance 9060 from a marker 9040 as a position-alignment stable area with respect to the marker 9040, and recognize the other area as a position-alignment unstable area.

In the first exemplary embodiment, a position-alignment unstable area is displayed on the display unit 1050. On the other hand, in a second exemplary embodiment, a position-alignment unstable area is displayed on a display screen observed by the user during MR experience, by using the position-alignment unstable area information stored in the data storage unit 1020.

The present exemplary embodiment differs from the first exemplary embodiment in that the image output unit 1040 outputs information not to the display unit 1050 but to the head-mounted display apparatus worn by the user 2020.

FIG. 7 illustrates a position-alignment unstable area. Portions equivalent to those in FIGS. 2 and 6 are assigned the same reference numerals, and descriptions thereof will be omitted. More specifically, FIG. 7 illustrates an example of an MR experience environment presumed to input the MR experience environmental information according to the present exemplary embodiment, in which the position-alignment unstable area 6000 is represented in three-dimensional form.

Figure 8:
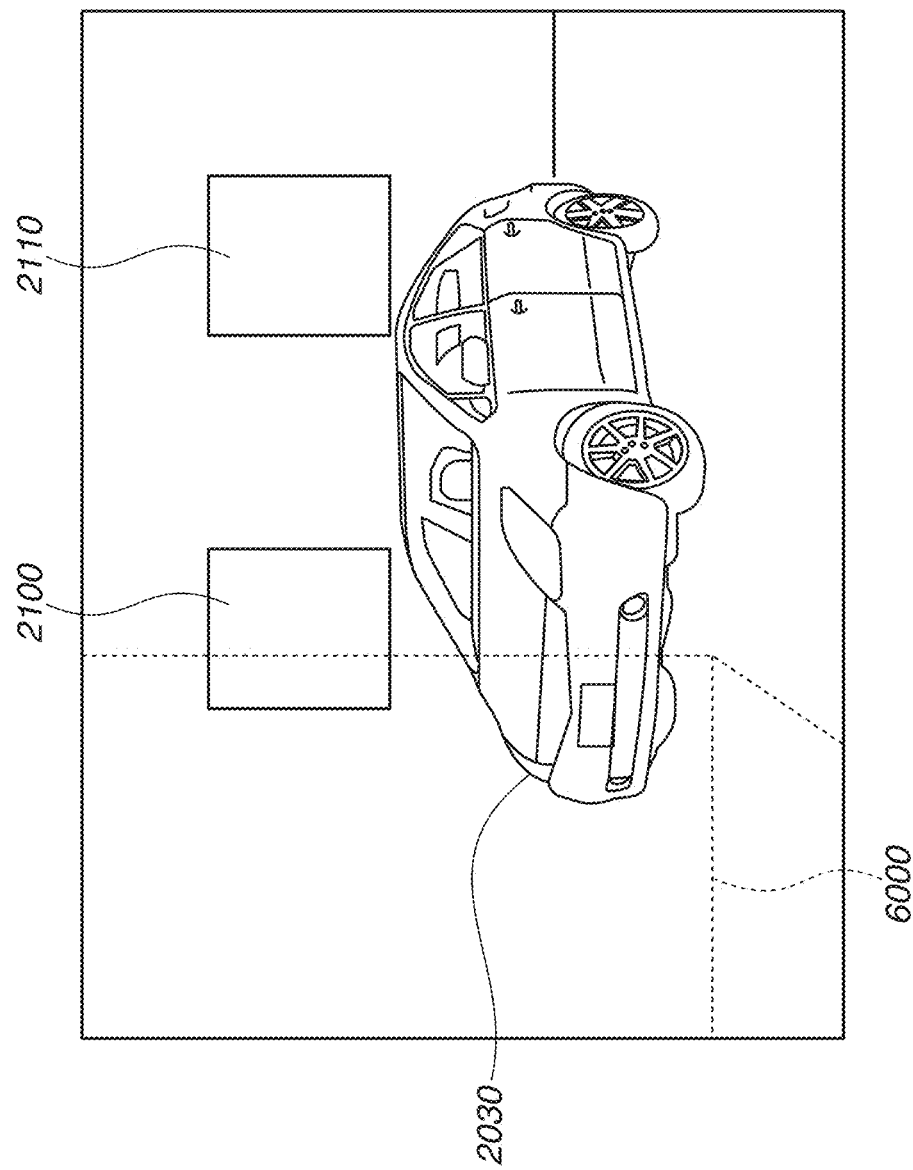
FIG. 8 illustrates an unstable area in an image observed by a user experiencing MR.
Figure 9:
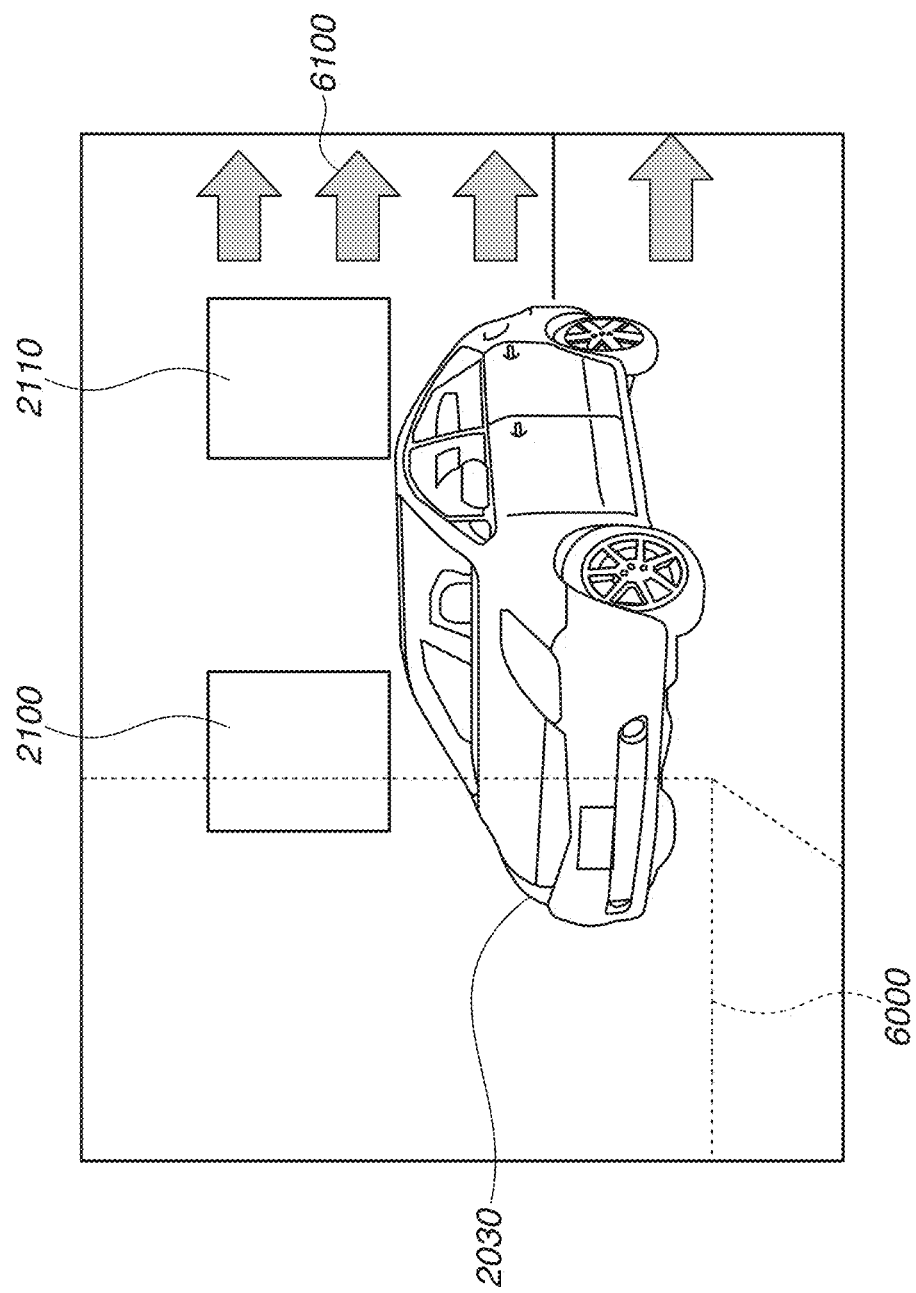
FIG. 9 illustrates an unstable area in the image observed by the user experiencing MR.

FIG. 8 illustrates a position-alignment unstable area. Portions equivalent to those in FIG. 7 are assigned the same reference numerals, and descriptions thereof will be omitted. FIG. 8 illustrates a video image seen by the user 2020 on a display unit 3020 of the head-mounted display apparatus 2050, into which the unstable area 6000 is inserted. More specifically, to provide the user 2020 with mixed reality experience, the main unit 1000 outputs the unstable area 6000 to the display unit 3020 of the head-mounted display apparatus 2050 mounted on the user's head. This configuration enables the user 2020 to recognize which area is an unstable area where the marker-based position and orientation measurement becomes unstable during MR experience. To guide the user 2020 from the unstable area 6000 to a stable area, guide arrows 6100 may be displayed to prompt the user 2020 to move, as illustrated in FIG. 9. If there is no unstable area within the area observable by the user 2020, information indicating the direction of an unstable area (e.g., an arrow) may be superimposed onto the image. Instead of outputting an unstable area directly from the image output unit 1040 to the head-mounted display apparatus 2050, the unstable area may be transmitted to the head-mounted display apparatus 2050 via the display unit 1050.

The display apparatus may be a face-mounted display apparatus instead of a head-mounted display apparatus.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-186532, filed Sep. 12, 2014, which is hereby incorporated by reference herein in its entirety.

What is claimed is:
1. An information processing apparatus comprising:
a first acquisition unit configured to acquire arrangement information of markers arranged in a real space;
a second acquisition unit configured to acquire imaging property of an imaging apparatus for capturing an image of the real space;

an estimation unit configured to estimate a position and orientation of the imaging apparatus based on the markers arranged in the captured image;

derivation unit configured to derive an unstable area where the imaging apparatus is unable to capture an image for stably estimating the position and orientation of the imaging apparatus, based on the arrangement information of the markers and the imaging property of the imaging apparatus; and a display unit configured to display the unstable area derived by the derivation unit.

2. The information processing apparatus according to claim 1, wherein the derivation unit derives an area where the marker arranged in the real space is not visible as the unstable area.

3. The information processing apparatus according to claim 1, wherein the marker includes identification information for identifying each marker, and wherein the derivation unit derives an area where the identification information included in the marker cannot be stably detected as the unstable area.

4. The information processing apparatus according to claim 1, wherein the marker has a rectangular shape.

5. The information processing apparatus according to claim 1, wherein the imaging property of the imaging apparatus includes at least one of a resolution, angle-of-view information, lens distortion information, and focal length information of the imaging apparatus.

6. The information processing apparatus according to claim 1, wherein the display unit displays a stable area with the unstable area.

7. The information processing apparatus according to claim 1, wherein the imaging apparatus is used while being mounted on a user's head or face.

8. An information processing apparatus comprising:

a first acquisition unit configured to acquire arrangement information of a markers arranged in a real space;

a second acquisition unit configured to acquire imaging property of an imaging apparatus for capturing an image of the real space;

an estimation unit configured to estimate a position and orientation of the imaging apparatus based on the markers arranged in the captured image;

a derivation unit configured to derive a stable area where the imaging apparatus is able to capture an image for stably estimating the position and orientation of the imaging apparatus, based on the arrangement information of the markers and the imaging property of the imaging apparatus; and a display unit configured to display the stable area derived by the derivation unit.

9. The information processing apparatus according to claim 8, wherein the derivation unit derives an area where the marker arranged in the real space is visible as the stable area.

10. The information processing apparatus according to claim 8, wherein the marker includes identification information for identifying each marker, and wherein the derivation unit derives an area where the identification information included in the marker can be stably detected as the stable area.

11. An information processing method comprising:

firstly acquiring arrangement information of and of markers arranged in a real space;

secondly acquiring imaging property of an imaging apparatus for capturing an image of the real space;

estimating a position and orientation of the imaging apparatus based on the markers arranged in the captured image;

deriving an unstable area where the imaging apparatus is unable to capture an image for stably estimating the position and orientation of the imaging apparatus, based on the arrangement information of the markers and the imaging property of the imaging apparatus; and displaying the unstable area.

12. An information processing method comprising:

firstly acquiring arrangement information of markers arranged in a real space;

secondly acquiring imaging property of an imaging apparatus for capturing an image of the real space;

estimating a position and orientation of the imaging apparatus based on the markers arranged in the captured image;

deriving a stable area where the imaging apparatus is able to capture an image for stably estimating the position and orientation of the imaging apparatus, based on the arrangement information of the marker and the imaging property of the imaging apparatus; and displaying the stable area.

13. A non-transitory recording medium storing a program for causing a computer to perform an information processing method comprising:

firstly acquiring arrangement information of markers arranged in a real space;

secondly acquiring imaging property of an imaging apparatus for capturing an image of the real space;

estimating a position and orientation of the imaging apparatus based on the markers arranged in the captured image;

deriving an unstable area where the imaging apparatus is unable to capture an image for stably estimating the position and orientation of the imaging apparatus, based on the arrangement information of the markers and the imaging property of the imaging apparatus; and displaying the unstable area derived.

14. A non-transitory recording medium storing a program for causing a computer to perform an information processing method:

firstly acquiring arrangement information of markers arranged in a real space;

secondly acquiring imaging property of an imaging apparatus for capturing an image of the real space;

estimating a position and orientation of the imaging apparatus based on the markers arranged in the captured image;

deriving a stable area where the imaging apparatus is able to capture an image for stably estimating the position and orientation of the imaging apparatus, based on the arrangement information of the markers and the imaging property of the imaging apparatus; and displaying the stable area derived.

15. The information processing method according to claim 11, wherein the deriving the unstable area derives an area where the marker arranged in the real space is not visible as the unstable area.

16. The information processing method according to claim 11, wherein the marker includes identification information for identifying each marker, and wherein the deriving the unstable area derives an area where the identification information included in the marker cannot be stably detected as the unstable area.

17. The information processing apparatus according to claim 1, wherein the first acquisition unit further acquires size information of the markers, and
    the derivation unit derives the unstable area based on the arrangement information and the size information of the markers and the imaging property of the imaging apparatus.

18. The information processing apparatus according to claim 1, wherein the display unit further displays guidance information to guide a user of the information processing apparatus from the unstable area to a stable area.

19. The information processing apparatus according to claim 18, wherein the display unit further displays a symbol indicating a direction from the unstable area to the stable area as the guidance information.

20. The information processing apparatus according to claim 8, wherein the first acquisition unit further acquires size information of the markers, and
    the derivation unit derives the stable area based on the arrangement information and the size information of the markers and the imaging property of the imaging apparatus.

\* \* \* \* \*